Patented Oct. 6, 1936

2,056,796

UNITED STATES PATENT OFFICE 2,056,796

POLYVINYL RESIN COMPOSITIONS AND PROCESS OF PREPARING SAME

Maurice L. Macht, Jersey City, and Alan F. Randolph, Montclair, N. J., assignors, by mesne assignments, to E. I. du Pont de Nemours & Company, Wilmington, Del., a corporation of Delaware No Drawing. Application April 26, 1934, Serial No. 722,485

6 Claims. (Cl. 106—22)

This invention relates to polyvinyl resin compositions and the process of preparing same and, more particularly, to granulated molding compositions comprising polyvinyl resins with or without other ingredients.

Molding compositions in granular form must fulfill certain conditions to be commercially acceptable. The ingredients of the compositions must be thoroughly blended together homogeneously to such a degree that an article subsequently molded from the mixture shall be of uniform composition and texture throughout, and of uniform color, that is, free from aggregates of undispersed coloring matter and from spots deficient in color. These compositions must be in granular to pulverulent condition to facilitate the handling. Customarily in molding shop practice the charges for the individual molds are made up by passing the granular compositions through a preforming or pelleting machine which automatically measures out a predetermined weight of the material and compresses the loose granular material into a hard and durable preform, this preform being much more readily loaded into the die than would be the material in its granular form.

Not only must the molding composition be in granular form but, in order to satisfactorily handle it in the preforming machines, it must not be too voluminous, that is to say, the granular material must have a sufficiently high bulk density, by which term is meant the apparent density of a granular molding compound in an untamped, loose condition, generally expressed in weight per unit volume as in the mixed term grams per cubic inch. The granular material must be in such condition as to feed readily by gravity from the hopper to the cavity of the pelleting machine and must not contain an undue proportion of fines which tend to cause the jamming of the plunger in the cavity of the pelleting machine by building up in the narrow clearance provided between them. Moreover, the granular material must not contain any individual particles of comparatively large size, as then the operation of the pelleting machine will be defective in that the automatic device which levels off the individual charge of material in the cavity will not accurately level material containing very coarse particles.

Heretofore various methods have been proposed for the preparation of molding compositions having a polyvinyl resin base which compositions have, in general, the properties outlined above but all of these methods suffer from material disadvantages of one sort or another, either as to the difficulty and expense of manufacture or as regards the quality of the products made.

An object of the present invention is to provide a simple and economical process of producing polyvinyl resin compositions particularly adapted for use in molding. A further object is to provide such a process wherein the polyvinyl resins are prepared in a novel form peculiarly adapted for granulation and use in molding operations. A still further object is to provide a process wherein the drawbacks encountered in the prior art are avoided. Other objects of the invention will be apparent from the description given hereinafter.

The above objects are accomplished according to the present invention by kneading a polyvinyl resin in suitable comminuted form at least until a homogeneous, compacted, coherent mass is obtained, and subsequently breaking said mass down into granular form. Preferably the resin, with or without plasticizer and various other auxiliary ingredients, is kneaded in a masticator mixer under positive pressure.

There are two alternative specific methods of carrying out this invention, each of which presents certain advantages over the other. In both methods the resin, with or without plasticizers and other ingredients, is kneaded until a homogeneous, compacted, coherent mass is obtained but in one method the kneading is stopped when the mixture is formed into a substantially homogeneous, cellulous, friable mass which is more or less spongy and non-transparent (even in the absence of insoluble ingredients), the mass removed from the kneading apparatus, and broken down into granular form; in the other method the kneading action is continued further until the known, fully colloided, rather tough, horny mass is formed which is removed from the kneading apparatus and subsequently broken down into granular form.

When the kneading is stopped at the point where the cellulous, friable mass is obtained, the mass can be removed from the mixer and easily reduced to granular form even while still hot from the kneading operation, whereas if the kneading is continued to give a fully colloided mass, then the mass must be cooled down to room temperature ordinarily to break it down into granular form. The mass produced according to the first alternative form of the invention, besides obviously not being fully colloided throughout, is distinctly cellulous, that is, it contains innumerable small cells or cavities. Despite this characteristic cellulous structure, the mass is well compacted and when broken down into granular form has a satisfactorily high bulk density, although not generally as high as the bulk density of the fully colloided material when broken down into granular form of the same mesh.

Masticator mixers are well known in the art, the "Banbury" mixer being a prominent example. In these masticator mixers the masticating action is largely produced by having a very small clearance between the blades of the mixer and the adjacent wall and forcing the material being mixed down into the small clearances by means of a pressure ram. The term "under positive pressure" is used herein in its customary sense in this art, namely, that a pressure ram, or equivalent device, is forcing the mixture down into the clearance between the blades of the mixer and the adjacent wall whereby an exceptionally strenuous masticating action is effected. Because of the strenuousness of this masticating or kneading action the polyvinyl resin, with or without additional ingredients, is in a few minutes time thoroughly homogenized and brought to the cellulous, friable form above described and upon only a few minutes more kneading the material is brought into the fully colloided state, whereas using mixing rolls it requires far more time and high temperatures to produce the fully colloided mass. As far as known, the cellulous, friable mass above described has never been obtained heretofore.

In carrying out the process ordinarily the mixture introduced into the masticator mixer and the mixer itself are at normal temperatures but the temperature of the mixture, due to friction, immediately begins to rise when the mixer is set in motion. Ordinarily the temperature of the mixture will not rise above 80° C. in the few minutes required to form the homogeneous, cellulous, friable mass above described and it is preferred that the temperature should not be allowed to materially exceed about 80 or 85° C. where it is desired to stop the kneading when the material has reached this state. On the other hand, if it is desired to produce the fully colloided material, the temperature will rise during the longer kneading operation to 105–110° C. and, in order to prevent any deleterious effects due to excessive temperatures, it is preferred that the temperature of the mixture should not be allowed to exceed 110° C., although this may be done under careful operating conditions without injury.

The following examples are given in order to illustrate specific embodiments of the present invention, parts being given by weight, and viscosities being determined on the basis of a benzol solution containing per liter an amount corresponding to one gram molecule of the monomer of the resin under discussion:—

*Example 1.*—An aldehyde-modified polyvinyl acetate resin was used. This resin was obtained by partial hydrolysis, to the extent of 75%, of a polymerized vinyl acetate having a viscosity of 13 centipoises, followed by treatment with formaldehyde, the general process of preparing such resins being disclosed in British Patent 351,082. This resin in comminuted form to pass through a 15-mesh screen was preliminarily mixed with oil red 0 by a short period of stirring together in a light powder mixer. The amount of the coloring ingredient used was 0.015 parts per 100 parts of the resin.

This preliminary mixture was introduced into a Banbury mixer in a sufficient quantity to fill the mixer to such a point that the pressure ram of the mixer operated to produce a pressure upon the contents during the kneading operation. The mixer was set into motion with the pressure ram in operating position to exert a pressure of 10–50 pounds per square inch on the mass within the mixer and the mixing was continued until a homogeneous, cellulous, friable mass was formed, the mixture becoming heated by internal friction to a maximum temperature of about 79° C. during the few minutes mixing. The mass obtained was somewhat spongy in appearance and was readily broken to pieces by hand even immediately upon removal from the mixer, while still hot. The cellulous, friable mass was readily broken down into a granular molding powder by being passed through a rotary grinder. There resulted a granular molding compound having the satisfactory bulk density of 7.4 grams per cubic inch and a screen analysis as given below, which compound pelleted satisfactorily in a standard pelleting machine and which, when molded in a heated die under pressure, yielded a molded article uniform in appearance and strength and a transparent red in color. The screen analysis was as follows:—

*Screen analysis*

|  |  |  | Percent |
|---|---|---|---|
| On | 10 | mesh | 1.5 |
| On | 20 | do | 82.0 |
| On | 40 | do | 14.0 |
| On | 60 | do | 2.0 |
| On | 80 | do | 0.2 |
| On | 100 | do | 0.1 |
| Through | 100 | do | 0.2 |

*Example 2.*—A second batch of the polyvinyl resin employed in Example 1 was kneaded in the Banbury beyond the point at which the cellulous, friable mass was obtained and in a few minutes a dense, horny, fully colloided resin was obtained, the temperature of the mass by that time having risen to 106° C. The resulting product, after removal from the Banbury mixer and being cooled to room temperature, was ground by means of a rotary grinder and yielded a granular molding compound of bulk density 7.4 grams per cubic inch and of a screen analysis as given below, which compound pelleted satisfactorily and which, when molded in a heated die under pressure, yielded a molded article similar to that described in Example 1. The screen analysis was as follows:—

*Screen analysis*

|  |  |  | Per cent |
|---|---|---|---|
| On | 10 | mesh | 0.7 |
| On | 20 | do | 83.5 |
| On | 40 | do | 13.9 |
| On | 60 | do | 1.3 |
| On | 80 | do | 0.2 |
| On | 100 | do | 0.2 |
| Through | 100 | do | 0.2 |

By comparison of the bulk density of the material produced in Examples 1 and 2 it can be seen that, despite the cellulous, friable structure of the mass at the time the kneading was stopped in Example 1, the resin had been compacted and gave a molding powder having practically the same bulk density as that shown in Example 2. This is not always true, the bulk density of the fully colloided material tending to be higher when ground to the same mesh.

In the following examples are given specific formulas to illustrate the type of compositions that can be worked as set forth in Examples 1 or 2:—

Example 3

| | Parts |
|---|---|
| An aldehyde-modified polyvinyl acetate resin made from polyvinyl acetate resin having a viscosity of 15 centipoises, hydrolyzed to the extent of 95% and reacted with formaldehyde | 100 |
| Dibutyl tartrate | 5 |
| Zinc oxide | 2 |
| Aluminum palmitate | 1 |

The dibutyl tartrate acts as a plasticizer, the zinc oxide as a pigment or filler and the aluminum palmitate as a mold lubricant.

Example 4

| | Parts |
|---|---|
| An aldehyde-modified polyvincyl acetate resin made from polyvinyl acetate resin having a viscosity of 45 centipoises, hydrolyzed to the extent of 70% and reacted with acetaldehyde | 100 |
| Tricresyl phosphate | 10 |
| Oil yellow F | 0.5 |

The tricresyl phosphate acts as a plasticizer and the oil yellow F as coloring matter.

Example 5

| | Parts |
|---|---|
| An aldehyde-modified polyvinyl acetate resin made from polyvinyl acetate resin having a viscosity of 15 centipoises, hydrolyzed to the extent of 70% and reacted with acetaldehyde | 100 |
| Chlor naphthalene | 20 |
| China clay | 80 |
| Titanium oxide | 5 |
| Hydrated chromium oxide | 1 |

The chlor naphthalene functioned as a plasticizer and the other ingredients as fillers and coloring matter.

Example 6

| | Parts |
|---|---|
| Polyvinyl acetate resin | 100 |
| China clay | 100 |
| Aluminum palmitate | 2 |
| Titanium oxide | 8 |
| Alizarine purple lake B | 2 |

The aluminum palmitate was used as a mold lubricant and the other ingredients as fillers and coloring matter.

Example 7

| | Parts |
|---|---|
| Vinyl resin resulting from the reaction of 100 parts by volume of active vinyl acetate and 12 parts by volume of acetaldehyde as disclosed in U. S. Pat. 1,746,665 | 100 |
| Zinc oxide | 1 |

The zinc oxide was used as a pigment.

Example 8

| | Parts |
|---|---|
| Vinyl resin obtained by the polymerization, in contact, of 70% vinyl chloride and 30% vinyl acetate as disclosed in French Patent 740,962 | 100 |
| Wood flour | 100 |
| Carbon black | 4 |

The wood flour and carbon black were used as filler and coloring matter, respectively.

Example 9

| | Parts |
|---|---|
| Vinyl resin same as in the preceding example | 100 |
| Diethylene glycol monophthalate | 10 |

The diethylene glycol monophthalate was employed as a plasticizer.

Example 10

| | Parts |
|---|---|
| Polystyrene | 100 |
| Tricresyl phosphate | 10 |
| Titanium oxide | 1 |
| Cadmium yellow | 0.1 |

The tricresyl phosphate was employed as a plasticizer and the other ingredients as pigments and coloring matter.

It is to be understood that the above examples merely illustrate specific methods of carrying out the present invention and specific compositions adapted for use in the present invention, which invention broadly relates to the process of treating polyvinyl resins, not only polyvinyl acetate resins modified by reaction with various aldehydes or not, but to polyvinyl resins derived from other vinyl esters such as the propionate and the butyrate, and polyvinyl resins derived from methyl vinyl ketone and other polymerizable vinyl compounds. As usually marketed these resins are obtained in comminuted form and, as a practical matter, they must be more or less comminuted in order that they may be introduced into the mixer. It is greatly preferred that the present invention be carried out in a masticator mixer, although other types of mixing apparatus which give a vigorous kneading action, such as a screw stuffer, may be employed.

Due to the fact that these polyvinyl resins can be molded without the addition of plasticizers, wherein they are distinguished from cellulose derivative compounds, it is optional whether or not plasticizers are included in the kneading operation. Almost invariably coloring matter, either a soluble dye or a pigment, will be mixed with the resin although this is not a necessary element in the invention. As indicated in the examples given, a wide variety of plasticizers may be employed. The following are listed as being eminently suitable:—

Tricresyl phosphate, diethyl phthalate, dibutyl phthalate, phenyl phthalate, p-toluene sulfonamide, methyl cyclohexanone, dibenzylin, chlornaphthalene, butyl cyclohexyl phthalate, diphenyl methane, p-tertiary amyl phenol, b-naphthyl ethyl ether, benzyl benzoate, ethylene glycol dibenzoate, ethyl lactate, isoamyl tartrate, dibutyl tartrate.

As will be apparent to those skilled in the art, other auxiliary ingredients beside plasticizers and coloring matter may be included in the resin compositions being kneaded, depending upon the effect and properties of the molding composition desired. Fillers may be included such as talc, China clay, wood flour, cotton flock, asbestos, and the like, as well as the so-called "effect materials" such as bronze powders and pearl essence. Also other plastic materials may be included such as cellulose esters, e. g., cellulose acetate, cellulose ethers, other types of resins such as phenol-formaldehyde resins, polyhydric alcohol-polybasic acid resins, shellac, diphenylol propane-formaldehyde resins, casein, and rubber. Mold lubricants, such as aluminum palmitate, calcium, stearate, and stearic acid, as well as waxes, such as carnauba wax, may be employed.

In the examples given no special provision was made for preliminary preparation of the coloring ingredients and it has been found that, with the majority of the molding compounds produced according to the present invention, most pigment colors if merely added dry in making the preliminary mixture will become uniformly dispersed throughout the mass within the time devoted to kneading, regardless of whether the kneading is carried only to the production of the cellulous, friable mass or further to the fully colloided, tough, horny mass. Certain pigments, however, are more refractory in this respect, tending to resist dispersion by the kneading action and to remain in agglomerated form, distributed through the mass, so as to produce a non-uniform or speckled appearance. When dealing with such pigments or when dealing with a molding mixture which is so readily kneaded to a homogeneous condition as to allow insufficient time for the dispersion of the coloring ingredient, it is preferred to subject the coloring ingredients to a preliminary treatment to promote their dispersion, as for example, grinding them either alone, or intimately with all or a portion of one of the other ingredients of the molding compound to be made.

The choice of additional ingredients and the proportions thereof to be used in these polyvinyl resin molding compositions is to be determined primarily by the desired properties in the finished molding powder and not by any considerations with respect to the carrying out of the present invention.

To practice the present invention in one form, the mixture comprising the polyvinyl resin must be formed into a substantially homogeneous, cellulous, friable mass but the further change into the ordinary horny, fully colloided mass should be avoided. It has been found that these resins become fully colloided, particularly with active plasticizers, as the temperature of the mass is increased and consequently high temperatures should preferably be avoided unless a fully colloided mass is desired and, even where a fully colloided mass is desired, it is not advisable to use excessive temperatures inasmuch as they may injuriously affect the composition, whereas the time of the kneading cycle even to make a fully colloided mass is a matter of rarely more than 5–8 minutes with the time for the kneading cycle in preparing the cellulous, friable mass even less.

In general, it has been found that there is no need to greatly exceed a temperature of 80 or 85° C. in forming the polyvinyl resins into the cellulous, friable form or to greatly exceed a temperature of 110° C. to form the polyvinyl resins into the fully colloided form.

Where the resin mixture and the mixer are at room temperature at the start, it has been found that positive cooling means are usually not required. The mixture does heat up due to internal friction but the short time required to form the mass into the desired state does not, as a rule, permit the temperature of the mixture to rise to a point where it is injurious. Where successive batches are being run through the mixer without allowing the mixer to cool, it may heat up to such a point that the mixture will, because of the heat absorbed from the mixer, reach the cellulous, friable form before the ingredients have become homogeneously mixed; if the batch is being run to produce the cellulous friable form of the plastic, it would then, under these conditions, be preferred to employ positive cooling means. Likewise positive cooling means would preferably be employed if the resin reached the fully colloided state well in advance of the time at which a substantially homogeneous mixture was obtained.

Positive heating means are unnecessary in the kneading apparatus as the internal friction due to the kneading automatically supplies the heat necessary but it may be advantageously employed if the mixture shows a tendency to become completely homogeneous before the desired degree of colloidalization is reached. By supplying external heat colloidalization is accelerated and thus the length of the kneading cycle may be shortened. Ordinarily no appreciable advantage will be gained by supplying external heat except where no plasticizer is employed, or where a relatively inactive one, or a relatively small proportion of a more active plasticizer is employed.

Those skilled in this art will readily appreciate whether the use of positive heating or cooling means is advisable or not, through consideration of the fact that the thoroughness of homogenization of the ingredients of the mixture is a function of the duration of the kneading action, whereas the speed of colloidalization is greatly influenced by the temperature, being increasingly faster as the temperature is raised and being retarded and, in fact, prevented completely if the temperature is lowered sufficiently.

In the specific examples a pressure of 10–50 pounds per square inch was used on the ram of the masticator mixer but the particular pressure is not in any way critical. Various mixers may be designed to operate under different pressures and the particular pressure is incidental as long as some positive pressure is exerted on the material to force it down into the small clearances and check the tendency of the material to merely ride around with the blades and avoid any kneading action at all.

The homogeneous, cellulous, friable mass may be immediately broken down into granular form upon removal from the mixer without waiting for the mass to cool. The reason for this is that in contradistinction to the ordinary continuous, horny masses produced by fully colloiding the resin, the cellulous, friable mass obtained according to one alternative embodiment of the present invention possesses a very considerable degree of friability even at temperatures in the neighborhood of 80° C. and therefore it is quite feasible, as well as being highly economical, to grind the mass immediately upon its discharge in hot condition from the mixer. On the other hand, the fully colloided mass should be cooled to at least room temperature before grinding in order that the grinding may be done satisfactorily. Any suitable means may be used for reducing the compacted resins to granular form such as a hammer mill, a rotary mill, a three-roll mill, and equivalent grinding mechanisms.

The homogeneous, cellulous, friable mass, as well as the fully colloided mass, obtained according to the present invention may be used for other purposes than the preparation of a molding compound. For example, it may be subjected, either with or without an intermediate grinding operation, to known plastics processes such as rolling, cake pressing, extrusion, dope making, and the like.

Among the advantages of the present invention are that it provides a process of forming a homogeneous, coherent, compacted molding composition without the use of volatile solvents which, as heretofore stated, involve additional expense. A further advantage of the present invention lies in the fact that the resins may be worked into condition for use in molding powders without exposing them to high temperatures for prolonged periods, a material drawback inherent in the heretofore known processes of working polyvinyl resins in the absence of volatile solvents. The shortness of the processing cycle according to the present invention is, of course, highly advantageous for economical operation as is the fact that in one alternative embodiment of the invention the cellulous, friable mass can be broken down into granular form immediately upon removal from the kneading apparatus without waiting for the material to cool. Not only does the present invention provide a process extremely economical in operation but it gives a molding composition eminently satisfactory both as to homogeneity and bulk density which means that it can be quickly and easily handled in the commercial pelleting and molding machines and gives a finished molded article uniform in appearance and composition throughout.

As many apparently widely different embodiments of this invention may be made without departing from the spirit and scope thereof, it is to be understood that the invention is not limited to the specific embodiments thereof except as defined in the appended claims.

We claim:

1. Process of preparing polyvinyl resin molding powders comprising kneading in the absence of volatile solvent a mixture comprising a polyvinyl resin and a plasticizer therefor, stopping said kneading when said mixture is formed into a substantially homogeneous, compacted, coherent, cellulous, friable mass, and breaking down said mass into granular form.

2. Process of preparing polyvinyl resin molding powders comprising kneading in the absence of volatile solvent in a masticator mixer under positive pressure a mixture comprising a polyvinyl acetate resin and a plasticizer therefor, stopping said kneading when said mixture is formed into a substantially homogeneous, compacted, coherent, cellulous, friable mass, removing said mass from the mixer, and breaking down said mass into granular form.

3. Process of preparing polyvinyl resin molding powders comprising kneading in the absence of volatile solvent in a masticator mixer under positive pressure a mixture comprising an aldehyde-modified polyvinyl acetate resin, a plasticizer therefor, and coloring matter, stopping said kneading when said mixture is formed into a substantially homogeneous, compacted coherent, cellulous, friable mass, and breaking down said mass into granular form.

4. In the process of preparing polyvinyl resin molding powders, the steps of kneading in the absence of volatile solvent a polyvinyl resin in comminuted form and stopping said kneading when said resin is formed into a substantially homogeneous, compacted, coherent, cellulous, friable mass.

5. Product comprising a polyvinyl acetate resin in a substantially homogeneous cellulous form which is friable at temperatures above room temperature and adapted to be granulated to give a molding composition having a bulk density of about 7.4 grams per cubic inch at a screen mesh of:

|  |  | Per cent |
|---|---|---|
| On 10 | mesh | 1.5 |
| On 20 | do | 82.0 |
| On 40 | do | 14.0 |
| On 60 | do | 2.0 |
| On 80 | do | 0.2 |
| On 100 | do | 0.1 |
| Through 100 | do | 0.2 |

6. Product comprising an aldehyde-modified polyvinyl acetate resin, a plasticizer therefor, and coloring matter, said product being in a substantially homogeneous cellulous form which is friable at temperatures above room temperature and adapted to be granulated to give a molding composition having a bulk density of about 7.4 grams per cubic inch at a screen mesh of:

|  |  | Per cent |
|---|---|---|
| On 10 | mesh | 1.5 |
| On 20 | do | 82.0 |
| On 40 | do | 14.0 |
| On 60 | do | 2.0 |
| On 80 | do | 0.2 |
| On 100 | do | 0.1 |
| Through 100 | do | 0.2 |

MAURICE L. MACHT.
ALAN F. RANDOLPH.